Patented June 17, 1952

UNITED STATES PATENT OFFICE 2,600,716

PREPARATION OF CELLULOSE ESTERS

Blanche B. White and Leonard J. Rosen, Summit, and Peter Blackman, Westfield, N. J., assignors to Celanese Corporation of America, a corporation of Delaware No Drawing. Application September 9, 1948, Serial No. 48,532

12 Claims. (Cl. 260—230)

This invention relates to the preparation of cellulose esters, and relates more particularly to a process for stabilizing organic acid esters of cellulose.

In the preparation of organic acid esters of cellulose, the esterification is usually carried out by treating cellulose with an organic acid anhydride in the presence of a catalyst for the esterification. This reaction may be performed in the presence of an inert diluent such as benzol which is a non-solvent for the ester, in which case the ester is obtained in the form of a suspension. The reaction may also be carried out in the presence of a solvent for the ester, and under these conditions the ester will be obtained as a viscous solution. The cellulose ester thus formed is ripened or hydrolyzed to develop the desired solubility characteristics therein, and then the cellulose ester is precipitated from solution, if necessary, by the addition of water or other non-solvents for the ester thereto, after which the ester is carefully washed. Despite the ripening treatment and the careful washing, the resultant cellulose ester contains an appreciable quantity of impurities which render it unstable, especially at high temperatures. Thus, if the cellulose ester is heated, as during spinning or molding operations, it will tend to discolor and to decompose or degrade.

It is an important object of this invention to provide a process for treating an organic acid ester of cellulose which will improve its stability.

A further object of this invention is to provide a process for stabilizing an organic acid ester of cellulose which will eliminate or greatly reduce the tendency of said ester to discolor and to decompose or degrade on heating.

A still further object of this invention is to provide a process for stabilizing an organic acid ester of cellulose without appreciable loss in the viscosity of said ester.

Other objects of this invention will be apparent from the following detailed description and claims.

We have found that a ripened organic acid ester of cellulose may be stabilized by incorporating said ester into a dilute aqueous solution of a monobasic, organic acid and subjecting the mixture so formed to super-atmospheric pressure at a temperature above the boiling point of water (100° C.). The stabilized cellulose ester which is produced by this treatment will have a materially lesser tendency than the unstabilized ester to discolor and to degrade or decompose when it is heated. The monobasic, organic acids which may be employed in carrying out this process include the lower aliphatic acids such as formic, acetic, propionic and butyric acids, as well as mixtures thereof.

While the process of this invention is applicable to the stabilization of various organic acid esters of cellulose including the lower aliphatic acid esters such as cellulose acetate, cellulose propionate and cellulose butyrate as well as to the mixed lower aliphatic acid esters such as cellulose acetate butyrate and cellulose acetate propionate, it is especially satisfactory for the stabilization of cellulose propionate, which is relatively hydrophobic being not readily wet by water, and accordingly, the process of this invention will be described in connection therewith.

To prepare the cellulose propionate, cellulose such as cotton, cotton linters, purified wood pulp or mixtures thereof is esterized with propionic anhydride. The cellulose may be pretreated before esterification with formic acid, acetic acid, propionic acid or other lower aliphatic acids either in liquid or vapor form, or it may be pretreated with a mixture of such acids and sulfuric acid or other catalyst to be employed during the subsequent esterification. Any other form of pretreatment of the cellulose may be employed or the cellulose may be esterified without any pretreatment whatsoever. The esterification catalyst employed may be sulfuric acid, phosphoric acid, zinc chloride or any other of the catalysts that are well known for this purpose.

The cellulose propionate may be prepared by the solution method, wherein the cellulose, pretreated or not, is subjected to the action of an esterification bath containing an appropriate amount of propionic anhydride, a catalyst and a solvent such as propionic acid in sufficient quantity to dissolve the cellulose propionate as it is formed. When esterification is carried out in this manner the cellulose propionate is obtained as a solution or dope.

After the cellulose propionate has been prepared, it is ripened to reduce its propionyl content and thereby alter its solubility characteristics in such solvents as acetone. Ripening may be carried out by adding water to the esterification mixture, with or without partial or complete neutralization of the catalyst, and holding the mixture so formed at room temperature or at a temperature slightly elevated above room temperature for a period ranging from about 20 to 70 hours or until the cellulose propionate has the desired solubility characteristics.

Ripening of the cellulose propionate may also be carried out in a much shorter period of time by incorporating water into the esterification mixture, with or without partial or complete neutralization of the catalyst, and holding the mixture so formed at elevated temperatures, above about 100° C., and at superatmospheric pressures for a much shorter period of time ranging from a few hours down to one hour or even less until the desired solubility characteristics are obtained. Cellulose propionate ripened in this manner yields, upon stabilization in accordance with the process of this invention, a stabilized product which suffers no appreciable loss in viscosity as compared to the unstabilized material when it is subjected to elevated temperatures, as during molding and develops considerably less color than said unstabilized material.

After the cellulose propionate has been ripened it is precipitated from solution by adding an excess of water or other non-solvent for the cellulose propionate to said solution. The precipitated cellulose propionate is then carefully washed, preferably with water of low mineral content such as distilled or demineralized water, which washing will eliminate certain of the soluble impurities therefrom. However, even after washing the cellulose propionate retains a quantity of impurities sufficient to render it unstable particularly when it is heated.

To stabilize the cellulose propionate in accordance with the process of this invention, the ripened and washed cellulose propionate is suspended in a dilute aqueous solution of propionic acid and the suspension is subjected to temperatures above about 100° C. at super-atmospheric pressures for a suitable period of time. In order to obtain these temperatures and pressures, the mixture of cellulose propionate and dilute acid may be charged into a pressure vessel and pressure developed therein by heating the charge. Pressure may also be developed in a continuous process by forcing the mixture of cellulose propionate and dilute acid through a heated element provided with a pressure controlled outlet valve, or through a heated element provided with a stand-pipe sufficiently high to develop the desired hydrostatic pressure.

The concentration of propionic acid employed in the stabilization may range from about 1 to 25%, or more, but must not be so high as to dissolve the cellulose propionate at the temperatures and pressures employed. The pressure may range from about 10 to 100 pounds per square inch, or more, above atmospheric and the corresponding temperatures will range from about 110 to 170° C., or more, over this pressure range. The weight of cellulose propionate in the stabilization mixture may be from about 2 to 25% of the weight of dilute acid in which the cellulose propionate is suspended. The reaction time necessary to insure stabilization will depend largely upon the value of the other variables. However, a reaction time of between about 0.25 and 5 hours will usually prove ample to effect the stabilization of the cellulose propionate. In general, the acid concentration, the pressure, the temperature and the reaction time may range upward from the minimum values given to below the point at which the cellulose propionate will be dissolved in the dilute propionic acid.

Instead of carrying out the stabilization in a single step, it may be carried out in two or more steps by treating the cellulose propionate with dilute propionic acid for a shorter period than is necessary to effect stabilization and replacing the acid with fresh acid, with or without an intermediate washing step, before continuing the stabilization treatment.

After the stabilization treatment, the dilute propionic acid is separated from the cellulose propionate in any desired manner and the cellulose propionate is washed with water of low mineral content to remove the remaining acid therefrom. The washed cellulose propionate is dried and may be used for any purpose such as the production of filaments, foils, solutions for coating or dipping, and it is especially useful for the production of molding material since it exhibits very little tendency to discolor or to decompose during the molding operation.

In certain cases, it has been discovered that there will be a greater reduction in the viscosity of the cellulose propionate when it is heated, as during molding, after having been stabilized in accordance with the process of this invention, than occurs in the unstabilized cellulose propionate. When this greater reduction in viscosity is excessive or undesirable it may be eliminated or greatly reduced by adding a small amount of a magnesium salt such as magnesium acetate or magnesium propionate to the stabilization mixture. These act as buffering agents, minimizing hydrolysis and depolymerization.

The greater reduction in viscosity may also be overcome or greatly reduced by adding an alkaline salt such as sodium acetate, lithium acetate, or magnesium citrate to the stabilized cellulose propionate in an amount sufficient to give said cellulose propionate an alkalinity of from about 50 to 200 p. p. m. calculated as calcium carbonate. The alkaline salt is added to the cellulose propionate after it has been stabilized with propionic acid and preferably after it has been washed to eliminate the acid therefrom. To carry out such an addition of alkaline salt, the cellulose propionate may be suspended in an aqueous solution of the salt and the suspension stirred until a sufficient quantity of salt has been absorbed or adsorbed into the cellulose propionate fibers. The solution is then drained from the fibers which are thereafter dried and are ready for use.

The following examples are given as illustrative of this invention.

*Example I*

Into a steam-jacketed pressure vessel equipped with a stirrer there are charged 10 parts by weight of a ripened cellulose propionate having a propionyl content of about 64.5%, and 100 parts by weight of 10% propionic acid. The pressure vessel is sealed, the stirrer is started and steam is admitted into the jacket until the pressure within the vessel reaches 25 pounds per square inch at which point the temperature will be approximately 130° C. Stirring is continued for a period of 2 hours with the pressure constant, after which the stabilization mixture is discharged from the reaction vessel. The cellulose propionate is washed with water of low mineral content to remove the propionic acid therefrom after which it is dried. When molded, the stabilized cellulose propionate develops only about 35% as much color as the unstabilized material, although its loss in viscosity is somewhat greater.

*Example II*

Into a steam-jacketed pressure vessel equipped with a stirrer, there are charged 10 parts by weight of a ripened cellulose propionate having a propionyl content of about 63.7%, and 100 parts by weight of 20% propionic acid. To this mixture are added 0.20 parts by weight of magnesium acetate. Thereafter, the pressure vessel is sealed, the stirrer is started and steam admitted to the jacket until the pressure within the vessel reaches 25 pounds per square inch. Stirring is continued for a period of two hours with the pressure constant, after which the stabilization mixture is discharged from the reaction vessel. The cellulose propionate is washed with distilled water to remove soluble materials therefrom after which it is dried. When molded, the stabilized cellulose propionate develops only about 60% as much color as the unstabilized material.

*Example III*

Into a steam-jacketed pressure vessel equipped with a stirrer, there are charged 10 parts by weight of a ripened cellulose propionate flake having a propionyl content of about 63.7%, and 100 parts by weight of 20% propionic acid. The pressure vessel is sealed, the stirrer is started and steam is admitted into the jacket until the pressure within the vessel reaches 25 pounds per square inch. Stirring is continued for a period of one hour at constant pressure, and then the pressure vessel is opened and the liquid therein is replaced with 100 parts by weight of fresh 20% propionic acid. The pressure vessel is again sealed and the pressure within the vessel is once more built up to 25 pounds per square inch and stirring continued for one hour at constant pressure. The cellulose propionate is then discharged from the pressure vessel and washed with distilled water to remove soluble materials therefrom. The cellulose propionate is suspended in 100 parts by weight of an aqueous solution containing about 0.0017 parts by weight of lithium acetate and stirred for one hour. Thereafter, the cellulose propionate is separated from the solution in which it is suspended and dried. An analysis shows that the cellulose propionate has an alkalinity of 55 p. p. m. calculated as calcium carbonate. When molded, the stabilized cellulose propionate develops only about 60% as much color as the unstabilized material and suffers a viscosity loss only 60% as great as the viscosity loss of the cellulose propionate before the addition of lithium acetate thereto.

*Example IV*

Into a steam-jacketed pressure vessel equipped with a stirrer, there are charged 10 parts by weight of a ripened cellulose propionate having a propionyl content of about 64%, and 200 parts by weight of 2% propionic acid. The pressure vessel is sealed, the stirrer is started and steam is admitted into the jacket until the pressure within the vessel reaches 70 pounds per square inch. Stirring is continued for a period of one hour with the pressure constant, after which the stabilization mixture is discharged from the pressure vessel. The cellulose propionate is washed with distilled water to remove soluble materials therefrom and is then dried. When molded, the stabilized cellulose propionate develops only 45% as much color as the unstabilized material, although its loss in viscosity is somewhat greater.

*Example V*

Onto 100 parts by weight of bleached cotton (5% moisture), there is sprayed a pretreatment mixture of 11 parts by weight of 90% formic acid, 30 parts by weight of propionic acid and 1.5 parts by weight of 95% sulfuric acid and the cotton is stirred in a rotary mixer for a period of two hours. An esterification solution is prepared by adding 400 parts by weight of propionic anhydride to 300 parts by weight of 99.5% propionic acid and the solution is cooled to about 0° C. At this point 2.9 parts by weight of 95% sulfuric acid are added to the solution and the temperature thereof is lowered to −25° C. by adding Dry Ice thereto. The pretreated cotton is charged into the esterification solution in approximately one minute and the temperature is permitted to rise to between 30 and 32° C. in a period of 70 minutes. The temperature is maintained at 30 to 32° C. until a microscopic examination indicates the dope to be relatively free of unesterified fibers which normally occurs within about 3 hours after the temperature reaches 30 to 32° C. The temperature is then lowered to 25° C. and held at this value until the charge is completely clear of fibers. To the cleared dope there is added 200 parts by weight of an equal mixture of 99.5% propionic acid and water over a half-hour period to convert all the excess propionic anhydride to propionic acid. There is then added 15 parts by weight of water and the dope is held at a temperature of 30° C. for one hour.

The sulfuric acid catalyst in the dope is neutralized by adding the equivalent weight of magnesium propionate plus as much as 20% excess thereto. The dope is then mixed with 150 parts by weight of water and is charged into a steam jacketed kettle equipped with a stirrer and maintained at 70° C. and under a nitrogen pressure of about 50 pounds per square inch. From the kettle, the dope is continuously pumped through a pipe maintained at 155° C. and at a pressure of 150 pounds per square inch to ripen the cellulose propionate. The retention time of the dope in said pipe is approximately 10.5 minutes during which time it is ripened, the propionyl value thereof being reduced to about 64.5%. The cellulose propionate is precipitated from the hot dope by adding sufficient water thereto after which the cellulose propionate is washed with distilled water.

Into a steam-jacketed pressure vessel there are charged 10 parts by weight of this rapidly ripened cellulose propionate and 100 parts by weight of 20% propionic acid. The pressure vessel is sealed, the stirrer is started and steam is admitted into the jacket until the pressure within the vessel reaches 25 pounds per square inch. Stirring is continued for a period of two hours with the pressure constant, after which the mixture is discharged from the pressure vessel. The cellulose propionate is washed with distilled water to remove soluble materials therefrom, and is then dried. When molded, the stabilized cellulose propionate suffers substantially no change in viscosity and develops only about 55% as much color as the unstabilized material.

It is to be understood that the foregoing detailed description is given merely by way of illustration and that many variations may be made therein without departing from the spirit of our invention.

Having described our invention, what we desire to secure by Letters Patent is:

1. Process for treating a ripened lower aliphatic acid ester of cellulose of an acid containing from 2 to 4 carbon atoms, which comprises subjecting a mixture of said ester in solid form and a dilute solution of a lower aliphatic acid containing from 1 to 4 carbon atoms to super-atmospheric pressure, at a temperature above about 100° C. whereby said ester is rendered more stable, the acid concentration, the pressure, the temperature, and the time of treatment being such that the ester does not pass into solution.

2. Process for treating a ripened lower aliphatic acid ester of cellulose of an acid containing from 2 to 4 carbon atoms, which comprises subjecting a mixture of said ester in solid form and a dilute solution of a lower aliphatic acid containing from 1 to 4 carbon atoms and having an acid concentration of at least about 1% by weight, to super-atmospheric pressure above about 10 pounds per square inch, at a temperature above about 100° C. whereby said ester is rendered more stable, the acid concentration, the pressure, the temperature, and the time of treatment being such that the ester does not pass into solution.

3. Process for treating a ripened lower aliphatic acid ester of cellulose of an acid containing from 2 to 4 carbon atoms, which comprises subjecting a mixture of said ester in solid form and a dilute solution of a lower aliphatic acid containing from 1 to 4 carbon atoms and having an acid concentration of between about 1 to 25% by weight, to super-atmospheric pressure between about 10 to 100 pounds per square inch, at a temperature between about 100 to 170° C. whereby said ester is rendered more stable, the acid concentration, the pressure, the temperature, and the time of treatment being such that the ester does not pass into solution.

4. Process for treating a ripened lower aliphatic acid ester of cellulose of an acid containing from 2 to 4 carbon atoms, which comprises subjecting a mixture of said ester in solid form and a dilute solution of a lower aliphatic acid containing from 1 to 4 carbon atoms and having an acid concentration of about 20% by weight, to super-atmospheric pressure of about 25 pounds per square inch, at a temperature of about 130° C. whereby said ester is rendered more stable, the acid concentration, the pressure, the temperature, and the time of treatment being such that the ester does not pass into solution.

5. Process for treating a ripened cellulose propionate, which comprises subjecting a mixture of said cellulose propionate in solid form and a dilute solution of propionic acid to super-atmospheric pressure, at a temperature above about 100° C. whereby said cellulose propionate is rendered more stable, the acid concentration, the pressure, the temperature, and the time of treatment being such that the cellulose propionate does not pass into solution.

6. Process for treating a ripened cellulose propionate, which comprises subjecting a mixture of said cellulose propionate in solid form and a dilute solution of propionic acid having an acid concentration of at least about 2% by weight, to super-atmospheric pressure above about 10 pounds per square inch, at a temperature above about 100° C. whereby said cellulose propionate is rendered more stable, the acid concentration, the pressure, the temperature, and the time of treatment being such that the cellulose propionate does not pass into solution.

7. Process for treating a ripened cellulose propionate, which comprises subjecting a mixture of said cellulose propionate in solid form and a dilute solution of propionic acid having an acid concentration of between about 1 to 25% by weight, to super-atmospheric pressure between about 10 to 100 pounds per square inch, at a temperature between about 100 to 170° C. whereby said cellulose propionate is rendered more stable, the acid concentration, the pressure, the temperature, and the time of treatment being such that the cellulose propionate does not pass into solution.

8. Process for treating a ripened cellulose propionate, which comprises subjecting a mixture of said cellulose propionate in solid form and a dilute solution of propionic acid having an acid concentration of about 20% by weight, to super-atmospheric pressure of about 25 pounds per square inch, at a temperature of about 130° C. whereby said cellulose propionate is rendered more stable.

9. Process for treating a ripened lower aliphatic acid ester of cellulose of an acid containing from 2 to 4 carbon atoms, which comprises subjecting a mixture of said ester in solid form, a dilute solution of a lower aliphatic acid containing from 1 to 4 carbon atoms, and a magnesium salt selected from the group consisting of magnesium acetate and magnesium propionate to super-atmospheric pressure, at a temperature above about 100° C. whereby said ester is rendered more stable, the acid concentration, the pressure, the temperature, and the time of treatment being such that the ester does not pass into solution.

10. Process for treating a ripened lower aliphatic acid ester of cellulose of an acid containing from 2 to 4 carbon atoms, which comprises subjecting a mixture of said ester in solid form and a dilute solution of a lower aliphatic acid containing from 1 to 4 carbon atoms to super-atmospheric pressure, at a temperature above about 100° C., the acid concentration, the pressure, the temperature, and the time of treatment being such that the ester does not pass into solution, and incorporating an alkaline salt into said ester in an amount sufficient to impart to said ester an alkalinity of from about 50 to 200 parts per million calculated as calcium carbonate whereby said ester is rendered more stable.

11. Process for treating a lower aliphatic acid ester of cellulose of an acid containing from 2 to 4 carbon atoms, which comprises ripening said ester at super-atmospheric pressure and at a temperature above about 100° C., and subjecting a mixture of said ripened ester in solid form and a dilute solution of a lower aliphatic acid containing from 1 to 4 carbon atoms to super-atmospheric pressure, at a temperature above about 100° C. whereby said ester is rendered more stable, the acid concentration, the pressure, the temperature, and the time of treatment being such that the ester does not pass into solution.

12. Process for treating cellulose propionate, which comprises ripening said cellulose propionate at a pressure of about 150 pounds per square inch and at a temperature of about 155° C., and subjecting a mixture of 10 parts by weight of said ripened cellulose propionate in solid form and 100 parts by weight of dilute propionic acid having an acid concentration of about 20% by weight, to super-atmospheric pressure of about 25 pounds per square inch, at a temperature of about 130° C. whereby said cellulose propionate is rendered more stable.

BLANCHE B. WHITE.
LEONARD J. ROSEN.
PETER BLACKMAN.

REFERENCES CITED

The following references are of record in the file of this patent:

UNITED STATES PATENTS

| Number | Name | Date |
|---|---|---|
| 2,028,761 | Dreyfus et al | Jan. 28, 1936 |
| 2,044,776 | Dreyfus et al. | June 23, 1936 |
| 2,095,822 | Malm et al. | Oct. 12, 1937 |
| 2,203,749 | Seymour et al. | June 11, 1940 |
| 2,232,794 | Martin | Feb. 25, 1941 |